United States Patent [19]
Yurosko

[11] Patent Number: 5,034,974
[45] Date of Patent: Jul. 23, 1991

[54] DENTAL X-RAY PATIENT IDENTIFICATION MARKING DEVICE

[76] Inventor: John J. Yurosko, 123 Shamrock Blvd., Venice, Fla. 34293

[21] Appl. No.: 518,135

[22] Filed: May 3, 1990

[51] Int. Cl.$^5$ .............................................. H05G 1/28
[52] U.S. Cl. .................... 378/166; 378/168; 378/170; 378/165
[58] Field of Search ............... 378/166, 165, 162, 168, 378/169, 170

[56] References Cited

U.S. PATENT DOCUMENTS

| | | | |
|---|---|---|---|
| 3,846,634 | 11/1974 | Fleming | 378/166 |
| 3,953,738 | 4/1976 | Huttner et al. | 378/166 |
| 3,959,657 | 5/1976 | Katz et al. | 378/166 |
| 3,962,585 | 6/1976 | Huttner et al. | 378/166 |
| 4,001,592 | 1/1977 | Katz et al. | 378/166 |
| 4,095,111 | 6/1978 | Katz et al. | 378/166 |
| 4,313,538 | 2/1982 | Bauer et al. | 378/165 |
| 4,383,329 | 5/1983 | Kröbel et al. | 378/166 |
| 4,679,222 | 7/1987 | Knopp | 378/166 |
| 4,764,948 | 8/1988 | Hurwitz | 378/165 |
| 4,928,298 | 5/1990 | Tanaka | 378/165 |

Primary Examiner—Edward P. Westin
Assistant Examiner—Kim-Kwok Chu
Attorney, Agent, or Firm—Charles J. Prescott

[57] ABSTRACT

A dental X-ray patient identification marking device for use in conjunction with an identification camera to permanently imprint preselected patient identification indicia onto each small dental X-ray before developing. A thin aperture plate, which may be removable, is positioned atop the working surface of the identification camera having a light-emitting area there within. The aperture plate includes an elongated hole near one end of structure for properly aligning the dental X-ray so that the hole is in alignment and registry with a particular portion of the X-ray. A thin indicia card having the preselected patient identification indicia written or typed thereon in a specified region of the card, is positionable between the aperture plate and the light-emitting area in alignment with the hole which produces an exposure of the preselected patient identification indicia at one end of the X-ray in response to light passing through the card.

3 Claims, 2 Drawing Sheets

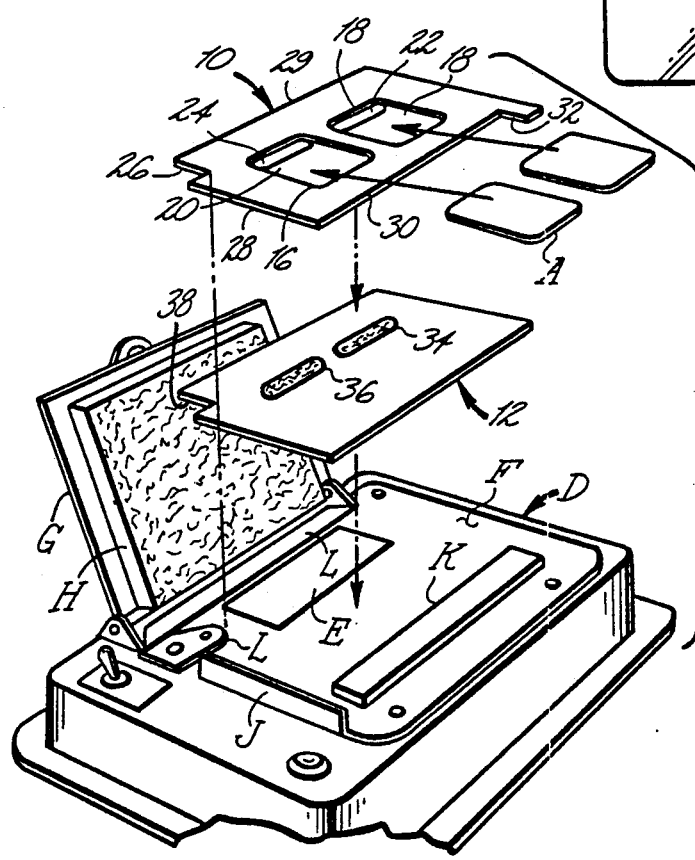

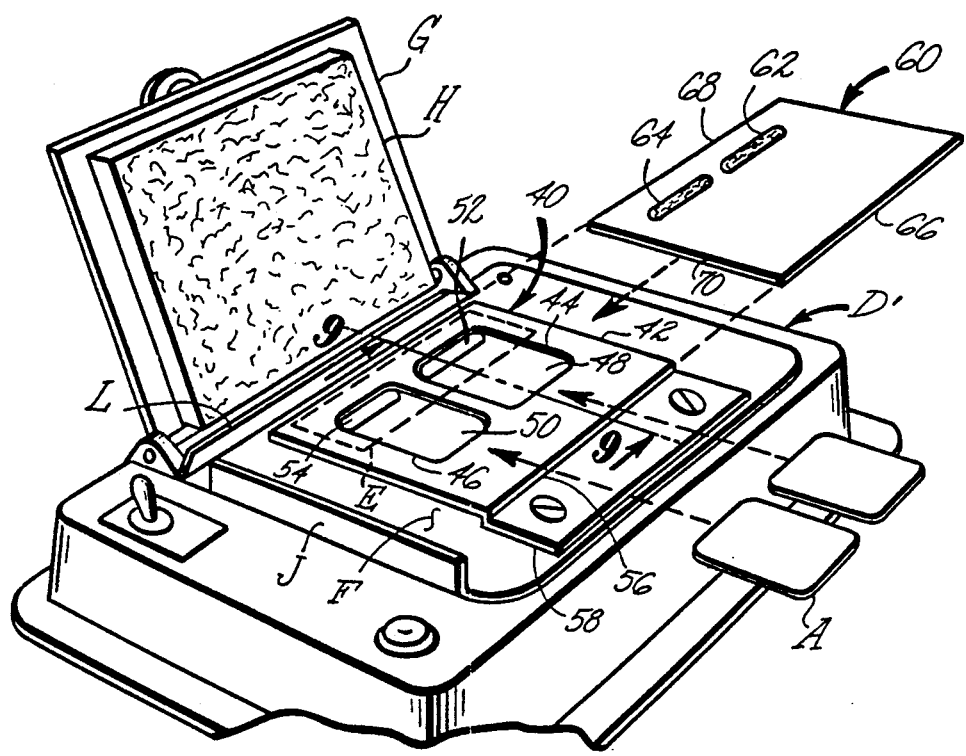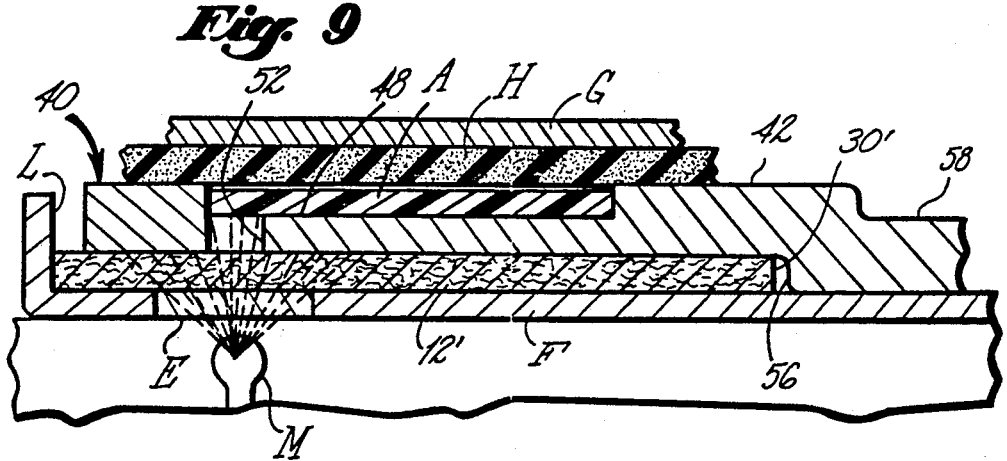

DENTAL X-RAY PATIENT IDENTIFICATION MARKING DEVICE

BACKGROUND OF THE INVENTION

This invention relates generally to the marking of x-rays, and more particularly to the imprinting of patient identification information onto the small, individual dental x-rays in conjunction with an identification camera.

The conventional techniques of marking larger x-rays utilized in medical diagnosis are not readily adaptable for imprinting patient identification information onto the very small, individual dental x-rays used by dental practitioners for x-raying individual teeth. Thus, should these small unidentified dental x-rays become detached from a patient's file, reconnecting them with the correct patient file may be difficult.

Presently, identification cameras as manufactured by Kodak Corp. and Picker Accessories, Inc. of New York under its catalog No. 390032 (called a "Picker I.D. Camera") are utilized for this purpose. These identification cameras include a light emitting area of a working surface atop which an exposed, but undeveloped, dental x-ray may be placed. After a thin paper card is placed beneath the x-ray having indicia printed thereon, the practitioner must then manually align the written indicia on the card with a portion of the x-ray onto which he wishes the indicia imprinted. This entire arrangement must be manually aligned and arranged over the light emitting area of the working surface, after which a cover is pivotally closed into place over the working surface and these materials, after which the light source is momentarily activated.

In most instances, the indicia is not properly imprinted onto the dental x-ray and, in some cases, the entire x-ray may be rendered useless due to the misalignment of the indicia imprinted over the critical x-ray portion. Further, the error may not be discovered until after the patient has left the office, causing further complications if the x-ray is rendered unusable at that time.

The present invention provides for a simple and inexpensive addition to an identification camera which may be made removable from, or connected onto, the working surface of these identification cameras. The invention provides for both proper alignment of the dental x-ray in conjunction with a small, elongated aperture beneath which an indicia card, having printed patient identification indicia placed thereon, is positioned over the light emitting region or area of the working surface. Thus, patient identification indicia is accurately and succinctly placed onto each dental x-ray after it has been exposed, but before developing and only in a specified region at one end of each dental x-ray.

BRIEF SUMMARY OF THE INVENTION

This invention is directed to a dental x-ray holder for use in conjunction with an identification camera to permanently imprint preselected patient identification indicia onto each small dental x-ray before developing. A thin aperture plate, which may be removable, is positioned atop the working surface of the identification camera having a light-emitting area therewithin. The aperture plate includes an elongated hole near one end of structure for properly aligning the dental x-ray so that the hole is in alignment and registry with a particular portion of the x-ray. A thin indicia card, having the preselected patient identification indicia written or typed thereon in a specified region of the card, is positionable between the aperture plate and the light-emitting area in alignment with the hole which produces an exposure of the preselected patient identification indicia at one end of the x-ray in response to light passing through the card.

It is therefore an object of this invention to provide an economical and convenient to use dental x-ray holder structured for use in conjunction with an identification camera for quickly and accurately placing patient identification indicia on each individual dental x-ray before developing.

It is another object to provide the above invention in the form of a removable addition to existing identification cameras.

It is yet another object to provide the above invention in conjunction with newly manufactured identification cameras.

In accordance with these and other objects which will become apparent hereinafter, the instant invention will now be described with reference to the accompanying drawings.

BRIEF DESCRIPTION OF THE DRAWINGS

FIG. 1 is a top plan view of the invention for use in conjunction with a presently available identification camera.

FIG. 2 is a section view in the direction of arrows 2—2 in FIG. 1.

FIG. 3 is a section view in the direction of arrows 3—3 in FIG. 1.

FIG. 4 is an enlarged view of the defined writing areas for placing patient identification therewithin.

FIG. 5 is a plan view of a conventional exposed, but undeveloped dental x-ray.

FIG. 6 is an exploded perspective view of the invention shown in FIG. 1 in use in conjunction with the identification camera.

FIG. 7 is a plan view of the dental x-ray shown in FIG. 5 having been subjected to the secondary exposure process depicted in FIG. 6 and having been fully developed.

FIG. 8 is an exploded perspective view of another embodiment of the invention incorporated into a newly manufactured identification camera.

FIG. 9 is a section view in the direction of arrows 9—9 in FIG. 8 with the lid in its closed position.

DETAILED DESCRIPTION OF THE INVENTION

Referring now to the drawings, and particularly to FIGS. 1 to 4, one embodiment of the invention is shown generally at numeral 10 in conjunction with a thin paper indicia card 12. The dental x-ray aperture plate 10 is fabricated of a flat sheet of aluminum or the like having a corner notch at 26 and a tab at 32 whose function will be described herebelow.

The aperture plate 10 includes a pair of cavities 14 and 16 each having an elongated hole 22 and 24, respectively, disposed at one end thereof through aperture plate 10. The overall perimeter profile of each cavity 14 and 16 is substantially similar to that of a conventional dental x-ray A' as shown in FIG. 5 which has been exposed within a patient's mouth, but is undeveloped. The depth of surfaces 18 and 20 of cavities 14 and 16 is such as to accommodate the thickness of this dental x-ray A so that, when placed within each cavity 14 and 16, the dental x-ray A is securely positioned therein.

Although only one such cavity 14 or 16 will function equally well, typically x-ray paks come with two unexposed dental x-rays contained therein so that the dental practitioner will automatically derive two identical x-rays per exposure for back-up use.

An indicia card 12 is also provided having corner notch 38 which is substantially similar to notch 26 formed into aperture plate 10. Also provided on indicia card 12 are two defined writing areas 34 and 36 which, when placed beneath and in alignment with the margins 28, 29, and 30 of aperture plate 10, are viewable through, and in alignment with, holes 22 and 24. It is within these defined writing areas 34 and 36 that the dental practitioner may write or type the patient identification indicia desired.

As best seen in FIG. 6, the indicia card 12 is placed beneath the aperture plate 10 so that notches 26 and 38 are in alignment and registry one to another and fitted against bracket L of an identification camera shown generally at numeral D. The identification camera D includes a flat working surface F having a light-emitting area E, a stop bar K and flanges J and L as shown. Lid G, hinge connected to the base of identification camera D, includes a layer of compressible foam material H which sandwiches the aperture plate 10, indicia card 12 and undeveloped dental x-rays A against working surface F when closed.

To establish proper alignment of aperture plate 10 and indicia card 12, tab 32 is sized to fit against the end of bar K, while edge 30 mates along the length of bar K. The opposite margin 29 mates against flange L, while the end margin 28 mates against flange J. Similarly, the corresponding margins of indicia card 12 are so aligned such that the defined writing areas 34 and 36 are in alignment with holes 22 and 24.

Once the arrangement shown in FIG. 6 is completed and lid G closed, a light source beneath light-emitting area E is momentarily activated to expose the patent identification indicia which has been imprinted within defined writing areas 34 and 36 onto dental x-rays A. After this second exposure of dental x-rays A and having been fully developed, the dental x-ray A' as a finished product is shown in FIG. 7, which includes an x-ray definition of the tooth area B, along with the patient identification indicia C which is positioned across the upper margin of the x-ray A'.

Referring now to FIGS. 8 and 9, another embodiment of the invention is there shown as a complete identification camera generally at numeral D'. In this embodiment D', the aperture plate shown generally at numeral 40 has been connected atop the flat working surface F. Aperture plate 40 includes the dental x-ray cavities 44 and 46 having holes 52 and 54 across one end and having depressed surfaces 48 and 50, respectively, atop which the undeveloped dental x-rays A are placed. The light-emitting area E' functions and is positioned similarly to that previously described.

However, in this embodiment D', all that need be done to expose the patient identification indicia onto the undeveloped dental x-rays A is to imprint the patient identification indicia onto the defined writing areas 62 and 64 of indicia card 60. When indicia card 60 is slid beneath aperture plate 40 in the direction of the arrows, edge margins 66 and 68 are aligned between bend 56 of aperture plate 40 and flange L and flange J mates against edge 70 of the indicia card 60 for full and complete alignment of writing areas 62 and 64 with holes 52 and 54.

Once the undeveloped dental x-rays A are properly arranged within cavities 44 and 46 and indicia card 60 is positioned beneath aperture plate 40 as best seen in FIG. 9, lid G is closed atop aperture plate 40 and dental x-rays A, wherein compressible foam layer H shields additional unwanted light exposure and all of the light emitting from light source M passing through light emitting surface E and holes 52 and 54 strike only the ends of dental x-rays A to produce the developed dental x-ray shown in FIG. 7.

As an alternate to the embodiment shown in FIGS. 8 and 9, the aperture plate 40 may be made easily removable, rather than being rigidly connected atop working surface F.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A dental x-ray patient identification marking device structured for use in conjunction with an identification camera comprising:
   a removable, thin aperture plate structured for positive flat positioning and orientation atop a light-emitting area of a working surface of said camera;
   said aperture plate having an elongated hole therethrough disposed at one end of means for aligning a small, undeveloped dental x-ray atop and flat against said aperture plate whereby said hole is aligned with a particular portion of said x-ray;
   indicia means positionable between said aperture plate and said light-emitting area in alignment with said hole for producing a patient identification exposure on said particular portion of said x-ray in response to light from said light-emitting area.

2. A dental x-ray patient identification marking device as set forth in claim 1, wherein:
   said aligning means is a cavity formed of uniform depth into the surface of said aperture plate having a perimeter which is substantially similar to that of said x-ray.

3. A dental x-ray patient identification marking device as set forth in claim 2, wherein:
   said indicia means is a thin card having a writing area defined thereon within which patient identification indicia may be imprinted.

* * * * *